United States Patent
Achenbach et al.

(10) Patent No.: US 10,676,641 B2
(45) Date of Patent: Jun. 9, 2020

(54) HIGHLY VISCOUS SILICONE COMPOSITIONS FOR PRODUCING ELASTOMERIC MOLDED PARTS BY MEANS OF BALLISTIC GENERATIVE METHODS

(71) Applicant: Wacker Chemie AG, Munich (DE)

(72) Inventors: Frank Achenbach, Simbach (DE); Ernst Selbertinger, Burghausen (DE); Wolfgang Ziche, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 80 days.

(21) Appl. No.: 15/744,396

(22) PCT Filed: Nov. 24, 2016

(86) PCT No.: PCT/EP2016/078739
§ 371 (c)(1),
(2) Date: Jan. 12, 2018

(87) PCT Pub. No.: WO2017/049496
PCT Pub. Date: Jun. 1, 2017

(65) Prior Publication Data
US 2018/0208797 A1    Jul. 26, 2018

Related U.S. Application Data

(63) Continuation of application No. PCT/EP2015/077854, filed on Nov. 26, 2015.

(51) Int. Cl.
| | |
|---|---|
| *C09D 183/04* | (2006.01) |
| *B33Y 70/00* | (2020.01) |
| *B33Y 10/00* | (2015.01) |
| *C08L 83/04* | (2006.01) |
| *C08L 83/14* | (2006.01) |
| *B29C 64/112* | (2017.01) |
| *C09D 7/61* | (2018.01) |
| *C09D 7/48* | (2018.01) |
| *C09D 7/63* | (2018.01) |
| *C08G 77/20* | (2006.01) |
| *C08G 77/12* | (2006.01) |
| *C08G 77/14* | (2006.01) |
| *B33Y 80/00* | (2015.01) |
| *B29K 83/00* | (2006.01) |
| *B29K 105/00* | (2006.01) |
| *B29K 105/16* | (2006.01) |
| *B29K 105/24* | (2006.01) |
| *B29K 509/08* | (2006.01) |

(52) U.S. Cl.
CPC .......... *C09D 183/04* (2013.01); *B29C 64/112* (2017.08); *B33Y 10/00* (2014.12); *B33Y 70/00* (2014.12); *C08L 83/04* (2013.01); *C08L 83/14* (2013.01); *C09D 7/48* (2018.01); *C09D 7/61* (2018.01); *C09D 7/63* (2018.01); *B29K 2083/005* (2013.01); *B29K 2105/0014* (2013.01); *B29K 2105/0038* (2013.01); *B29K 2105/0044* (2013.01); *B29K 2105/0094* (2013.01); *B29K 2105/162* (2013.01); *B29K 2105/24* (2013.01); *B29K 2509/08* (2013.01); *B33Y 80/00* (2014.12); *C08G 77/12* (2013.01); *C08G 77/14* (2013.01); *C08G 77/20* (2013.01)

(58) Field of Classification Search
CPC .......... C09D 183/04; C09D 7/48; C09D 7/63; C09D 7/61; B33Y 80/00; B33Y 10/00; B33Y 70/00; B29C 64/112
USPC .......................................................... 524/765
See application file for complete search history.

(56) References Cited

U.S. PATENT DOCUMENTS

| | | | |
|---|---|---|---|
| 3,884,866 | A | 5/1975 | Jeram et al. |
| 5,057,151 | A | 10/1991 | Schuster et al. |
| 5,686,054 | A | 11/1997 | Barthel et al. |
| 2004/0131527 | A1 | 7/2004 | Gottschalk-Gauldig et al. |
| 2007/0106016 | A1 | 5/2007 | Zhu |
| 2007/0287771 | A1 | 12/2007 | Yamazaki et al. |
| 2010/0256300 | A1 | 10/2010 | Jandke et al. |
| 2010/0292361 | A1 | 11/2010 | Koellnberger |
| 2011/0003906 | A1 | 1/2011 | Angermaier et al. |
| 2011/0196096 | A1 | 8/2011 | Angermaier et al. |
| 2012/0045629 | A1 | 2/2012 | Greer et al. |
| 2013/0200554 | A1* | 8/2013 | Mueller ............... C08J 3/24 264/477 |
| 2016/0312034 | A1 | 10/2016 | Schneider et al. |
| 2016/0332382 | A1* | 11/2016 | Coward ................ B29B 7/38 |
| 2017/0312981 | A1 | 11/2017 | Selbertinger et al. |
| 2018/0066115 | A1 | 3/2018 | Achenbach et al. |

FOREIGN PATENT DOCUMENTS

| | | |
|---|---|---|
| DE | 3839900 A1 | 5/1990 |
| DE | 102008000156 A1 | 7/2009 |
| DE | 102008043316 A1 | 5/2010 |
| DE | 102009002231 A1 | 10/2010 |

(Continued)

OTHER PUBLICATIONS

A. Gebhardt: "Generative Fertigungsverfahren", 2013, Carl Hanser Verlag.

(Continued)

*Primary Examiner* — Hui H Chin
(74) *Attorney, Agent, or Firm* — Brooks Kushman P.C.

(57) ABSTRACT

Curable silicone rubber compositions of high viscosity can be ballistically printed if the melt flow index is within a defined shear thinning range and the viscosity is also within a defined range.

17 Claims, 2 Drawing Sheets

(56) References Cited

FOREIGN PATENT DOCUMENTS

| | | |
|---|---|---|
| DE | 102009027486 A1 | 1/2011 |
| DE | 102010043149 A1 | 5/2012 |
| DE | 102011012412 A1 | 8/2012 |
| DE | 102011012480 A1 | 8/2012 |
| DE | 102013226494 A1 | 6/2015 |
| EP | 0122008 A1 | 10/1984 |
| EP | 0146307 A2 | 6/1985 |
| EP | 107726 B1 | 4/1989 |
| EP | 0358452 A2 | 3/1990 |
| EP | 0398701 A2 | 11/1990 |
| EP | 0561893 A1 | 9/1993 |
| EP | 0561919 A1 | 9/1993 |
| EP | 0686676 A1 | 12/1995 |
| EP | 1050538 A2 | 11/2000 |
| EP | 1433749 A1 | 6/2004 |
| EP | 1361253 B1 | 4/2006 |
| EP | 1803728 A1 | 7/2007 |
| EP | 2100921 * | 9/2009 |
| EP | 2100921 A1 | 9/2009 |
| JP | 2012233035 A | 11/2012 |
| KR | 10-2008-0070818 A | 7/2008 |
| WO | 9210529 A1 | 6/1992 |
| WO | 9210543 A1 | 6/1992 |
| WO | 07142845 A2 | 12/2007 |
| WO | 2009027133 A2 | 3/2009 |
| WO | 11079402 A1 | 7/2011 |
| WO | 2015107333 A1 | 7/2015 |
| WO | 16071241 A1 | 5/2016 |
| WO | 17081028 A1 | 5/2017 |

OTHER PUBLICATIONS

Brian Derby: Inkjet Printing of Functional and Structural Materials: Fluid Property Requirements, Feature Stability and Resolution, Annu. Rev. Mater. Res., vol. 40, 2010, pp. 395-414.
G. W. Sears, Analyt. Chem., vol. 28, 1956, pp. 1981 ff.
Wacker—Interim Report "3D Printing with Silicones"—Jan.-Jun. 2015 (Published Aug. 3, 2015). 8 pages.
Kahmann & Ellerbrock, Wacker Silicones, 16 pages. (www.KE.de) and English Abstract.
Wacker—Semicosil 988-1K "Curing at the Speed of Light", 12 pages.
Wacker Announces New Silicone 3D Printing Technology, 6 pages. https://3dprint.com/88316/wacker-3d-printed-silicone/, Feb. 10, 2019.
Semicosil UV Curing at the Speed of Light.
Chhabra Non-Newtonian Fluids, "Non-Newtonian Fluids: An Introduction". 33 pages.
Larousse Dictionary of Science and Technology, 1995, 3 pages. p. 688.
Hans-Peter Wolf, "Viskosität bestimmt Verhalten" 2 pages, and English Abstract.
Yang et al, "High Viscosity Jetting System or 3D Reactive Inkjet Printing," pp. 505-513. 9 pages.

* cited by examiner

HIGHLY VISCOUS SILICONE COMPOSITIONS FOR PRODUCING ELASTOMERIC MOLDED PARTS BY MEANS OF BALLISTIC GENERATIVE METHODS

CROSS REFERENCE TO RELATED APPLICATIONS

This application is the U.S. National Phase of PCT Appln. No. PCT/EP2016/078739 filed Nov. 24, 2016, which claims priority to PCT Application No. PCT/EP2015/077854 filed Nov. 26, 2015, the disclosures of which are incorporated in their entirety by reference herein.

BACKGROUND OF THE INVENTION

1. Field of the Invention

The invention relates to high-viscosity crosslinkable silicone rubber compositions, the inventive properties of which enable the production of elastomeric shaped bodies by means of ballistic additive methods (3D printing).

2. Description of the Related Art

Numerous methods are available for the production of elastomeric moldings proceeding from crosslinkable silicone rubber compositions. According to the consistency and mechanism of crosslinking of the silicone rubber composition, moldings can be produced, for example, by injection molding, by compression molding, by extrusion methods, by calendering, casting, etc. What is common to these conventional methods is that the properties of the molding formed (hardness, tear resistance, extensibility, color etc.) are fixed essentially by the physical composition of the crosslinkable silicone rubber composition, which means that these methods typically afford silicone moldings that are substantially isotropic in terms of their mechanical, optical and electrical properties. The shape of the silicone parts formed in this way is fixed either through use of specific molds (injection molds, press-molding molds, casting molds), within which the crosslinking is effected, or by means of extrusion dies, calendering rolls etc.

However, the conventional processing methods are increasingly meeting their limits when silicone moldings of more complex geometry, of different material composition and/or of variable profiles of properties are required. The general trend toward individualization and individual adjustment of everyday articles is additionally requiring smaller numbers of items (e.g. prototypes, individually adapted prostheses, etc.), the necessity of rapid availability, and simple changeover to new product series, which means that conventional methods are no longer efficient.

A method that is becoming increasingly important for production of moldings is the additive manufacturing method (3D printing method), which comprises numerous different techniques having the common factor of automated additive layer buildup of the molding (A. Gebhardt, Generative Fertigungsverfahren [Additive Manufacturing Methods], Carl Hanser Verlag, Munich 2013). The additive manufacturing method not only makes it possible to avoid the above mentioned shortcomings of the conventional processing methods, but also enables a fundamentally new design of molded articles.

The additive layer-by-layer buildup of the molding can be effected by crosslinking an applied layer of the crosslinkable material in a location-selective manner, for example by means of a laser. Location-selective crosslinking means that only that material in the layer which forms the later molded article is crosslinked; the uncrosslinked material is ultimately removed and can optionally be reused. However, additive layer-by-layer buildup of the molding can also be effected by applying the crosslinkable material in a location-selective manner (for example by means of a printhead in the form of discrete droplets), i.e. only at those sites that will be part of the shaped body to be formed. The layer applied in this way will generally not be continuous, but will directly reflect a cross section of the desired shaped body. The material applied in a location-selective manner is subsequently crosslinked (for example by full-area irradiation), and the next layer is applied in a location-selective manner, etc. If necessitated by the shape of the part to be printed (for example in the case of overhanging structures, cavities etc.), it is possible to apply a suitable support material in addition to the crosslinkable silicone material, which can be removed again after the printing operation has ended. The location-selective application of the crosslinkable material can be effected, for example, by means of discontinuous (discrete) jetting of droplets (so called "ballistic methods") or by continuous dispensing of thin strands. In principle, jetting as compared with dispensing enables the printing of finer structural details and more complex structures. The advantage of dispensing is that it is possible to apply greater amounts of material per unit time. In addition, dispensing enables application of higher-viscosity materials as well, such that it can be advantageous to combine the two techniques by also mounting one or, if appropriate, more than one dispensing nozzle in addition to the jetting nozzle(s) in the 3D printer. In this way, it is possible, for example, to form filigree parts of the shaped body by means of the jetting nozzle and to print larger voluminous parts of the shaped body by dispensing. With regard to the rheological demands that jetting and dispensing make on the material to be printed, jetting is found to be significantly more demanding.

WO2015/107333 A1 describes a 3D printing method for production of prostheses from silicone elastomers by (continuous) extrusion of the crosslinkable silicone rubber composition from a mixing nozzle. The 3D printing is optionally assisted by a second mixing nozzle for extrusion of a thermoplastic material which serves as support material for the silicone rubber composition to be printed. The crosslinking of the silicone rubber composition is effected by platinum-catalyzed addition reaction at room temperature (hydrosilylation). A disadvantage of this process is the unachievable spatially exact positioning of ultrasmall amounts of silicone rubber composition for the printing of fine details. Furthermore, it is no longer possible to influence the juncture of crosslinking after the mixing of the two rubber components, one disadvantage of which is that, in the course of the printing operation, regions of the silicone rubber composition having very different degrees of crosslinking are brought into contact (when the processing time for the rubber composition is shorter than the printing time), or that the printed structure is not self-supporting (processing time longer than printing time).

A specific embodiment of the additive manufacturing method is that of the ballistic method which features location-selective application of the crosslinkable composition with the aid of a printhead in the form of individual droplets (voxels) (jetting; inkjet printing; drop-on-demand printing). The composition applied can subsequently be crosslinked, for example by means of electromagnetic radiation, and thus forms a thin layer of the molding. This operation of layer-by-layer buildup is repeated until the complete shaped body has been formed.

In the case of the ballistic methods (jetting), a basic distinction is drawn between continuous inkjet (CIJ) printing and drop-on-demand (DOD) inkjet printing. Both methods can generate droplets having diameters of 10 µm up to a few hundred µm.

In the CIJ method, a continuous stream of droplets is generated by expulsion of the material from a nozzle under high pressure and breakdown of the resultant liquid jet to individual droplets as a result of Rayleigh instability. The electrostatically charged droplets are directed by means of electrical deflecting plates such that they either arrive at a precise location on the working plane (substrate) or (if there is to be no printing) arrive in a return channel through which they can be sent to reuse. This recycling of the material to be printed, in the case of crosslinkable silicone rubber compositions, as well as the contamination risk, has the serious danger of bulk alteration of the rheological properties owing to incipient crosslinking and is therefore impractical.

By contrast, in the DOD method, droplets are only produced if required, all of which are deposited in a location-selective manner for formation of the molding, either in that a positioning robot exactly positions the jetting nozzle in the x,y,z direction or in that the working plane is moved correspondingly in the x,y,z direction; in principle, both options can also be implemented simultaneously.

DE 10 2011 012 412 A1 and DE 10 2011 012 480 A1 describe an apparatus and a method for stepwise production of 3-D structures with a printhead arrangement having at least two, preferably 50 to 200, printhead nozzles, which enables the location-selective application of optionally multiple photocrosslinkable materials with different photosensitivity, wherein the photocrosslinkable materials can subsequently be consolidated in a location-selective manner by electromagnetic radiation, especially by two-photon or multiphoton processes in the focus region of a laser. The application of the photocrosslinkable materials by means of inkjet printing places specific demands on the viscosity of the photocrosslinkable materials. For instance, the photocrosslinkable materials feature a viscosity of less than 200 mPa·s, especially less than 80 mPa·s, more preferably less than 40 mPa·s. However, typical silicone rubber compositions, especially high-viscosity silicone rubber compositions, have a viscosity several orders of magnitude higher and therefore cannot be jetted with the inkjet print nozzles described here. In order to achieve adequate crosslinking of the material applied by means of two- or multiphoton polymerization, photoinitiators matched to the laser wavelength and a polymeric crosslinker component containing photocrosslinkable groups are additionally required, where the photocrosslinkable groups belong to the class of the acrylates, methacrylates, acrylamides, methacrylamides, urethane acrylates, urethane methacrylates, urea acrylates and urea methacrylates. However, the method described is unsuitable for production of moldings consisting of silicone elastomers. Firstly, the photoinitiators, photosensitizers, coinitiators etc. that are used have only sparing solubility in the (nonpolar) silicone compositions, which leads to cloudiness, microphase separation and inhomogeneity. As is well-known, the free-radical curing of silicones functionalized with the aforementioned photocrosslinkable groups has the problem of inhibition caused by oxygen, which considerably lowers the crosslinking rate and results in tacky surfaces. If this effect is counteracted by increasing the function density of acrylate groups, for example, the result is nonelastic, brittle vulcanizates. Finally, the extremely high local photon density which is required for multiphoton polymerization (especially as a result of the low function density of photopolymerizable groups) and is generated by means of pulsed femtosecond lasers causes breakdown reactions (carbonization) in the silicone, which leads to unacceptable discoloration and damage to the material.

In the DOD method, the resolution of structural details of the shaped body to be formed depends in particular on the size of the droplets jetted (voxels) and the spatially exact application thereof. In general, it is possible to generate finer structural details by means of smaller droplets. Since the frequency with which the printhead produces the droplets is limited, the use of smaller droplets will, however, inevitably lead to longer production times for the molding, and so a compromise has to be made in the individual case between dimensional accuracy and production time. However, the size of the droplets, which can be varied within wide limits through suitable design of the printhead, depends to a crucial degree on the rheological properties of the crosslinkable composition. It is generally the case that low-viscosity compositions permit the jetting of smaller droplets with higher frequency, whereas higher-viscosity compositions cause the currently available printheads to rapidly reach their limits.

A more detailed consideration of the jetting method shows that a satisfactory print (i.e. a dimensionally exact elastomer part) is obtained only when the technical parameters of the printhead are compatible with the properties, especially the rheological properties, of the material to be printed.

Essential technical parameters of the printhead are the pressure differential between the material reservoir and nozzle outlet, the nozzle diameter and the time within which the entire amount of a droplet leaves the nozzle (ejection time). Useful printheads especially include (thermal) bubblejet and piezo printheads, particular preference being given to piezo printheads, which are also able to jet higher-viscosity materials, for the printing of elastomer parts. These are commercially available (e.g. printheads from "NORDSON CORP./USA" and "VERMES MICRODISPENSING GMBH/Germany"). These piezo printheads enable a pressure buildup in the kbar range, which means that amounts of liquid in the pl to nl range can be expelled within 1-100 µs through a nozzle having diameters between 50 and 500 µm with a speed of 1-100 m/s. This operation is repeated with a frequency of up to a few hundred Hz (these are typical size ranges, which can differ considerably in the individual case). In addition to these technical parameters of the print valves, the rheological properties of the material to be printed are also found to be crucial. It is important to emphasize that the material does not leave the nozzle as finished droplets; instead, a droplet formation process proceeds. The material leaves the nozzle at first in the form of a laminar jet, with rapid formation of oval thickening (because of the main droplet) at the head end, but this still remains bound to the nozzle outlet via a thinner material thread. Subsequently, various scenarios are possible. If the material thread becomes detached at the nozzle outlet and subsequently combines with the main droplet, the result is a single drop, the speed of which slows considerably owing to the elastic combining process. If, by contrast, the material thread becomes detached both at the nozzle outlet and at the main droplet, elastic contraction can result in formation of a second droplet (satellite). The satellite and main droplet can hit the substrate surface one after another (working plane), but can also still combine during the flight phase to give a single droplet. However, the material thread that has become detached can also narrow at multiple points and ultimately form multiple satellite droplets, all of which can subsequently hit the substrate.

If the material thread does not become detached immediately at the nozzle outlet, the portion of the material thread remaining at the nozzle outlet will contract, resulting in blockage of the nozzle, which leads to failure of the printhead.

Considering, moreover, that the movement robot that positions the printhead in the x,y plane continuously traverses the x,y plane (i.e. without stopping at the individual points (x,y)), it becomes understandable that the formation of satellites will inevitably lead to a fuzzy print, since the print nozzle, by the time at which the material thread becomes detached at the nozzle outlet, has already moved further in the direction of the next (x,y) point (typical speeds of the movement unit are between 0.1 and 1 m/s).

The droplet that hits the working plane at high speed can likewise behave in different ways. It can be deformed, for example, to give a sphere segment-like, sphere-like or donut-like shape, where the usually circular footprint of this shape has a greater diameter than the nozzle as a result of the outward spread of the droplet. The droplet can also form a crown-like shape on impact, which then immediately splashes tiny droplets in the radial direction. This splashing also leads to an unclean print. The positioned droplets, owing to the extremely high shear rate in the nozzle, as a result of slow relaxation to the starting viscosity, can still have a very low viscosity and spread outward too significantly. For this reason, thixotropic additives, which bring about a rapid recovery in viscosity of the jetted compound and prevent an excessive outward spread or splashing, are added to silicone rubber compositions having relatively low viscosity, which shall be understood to mean viscosities of less than 300 Pa·s (at 25° C. and 0.5 s$^{-1}$). On the other hand, excessively rapid relaxation to the high starting viscosity in the presence of a yield point can lead to droplet shapes like a conical hat, having a rough surface for lack of adequate leveling. Shear-thickening rheological characteristics of the droplet can even lead to rebound of the impacted droplet.

It will be apparent to the person skilled in the art from the above that only through the exact matching of the technical parameters of the printhead with the rheological material properties is the production of high-quality molded articles possible. In the case of production of moldings proceeding from silicone rubber compounds by means of ballistic 3D printing methods, there are some additionally complicating boundary conditions. The production of silicone elastomers having good mechanical properties (elongation at break, extensibility, tear propagation resistance etc.) is only possible when a) sufficiently long silicone polymers (i.e. with a sufficiently high degree of polymerization or molecular weight) are used and b) actively reinforcing fillers (fumed silicas, carbon blacks etc.) are simultaneously present in the composition. Both of these lead unavoidably to silicone rubber compounds having high viscosity, which is a barrier to clean droplet formation in jetting. High viscosities, which shall be understood to mean viscosities of 300 Pa·s to 10 kPa·s (at 25° C. and 0.5 s$^{-1}$), make the rapid detachment of the material thread at the nozzle outlet more difficult, meaning that the main droplet remains connected to the nozzle via the material thread for a comparatively long period, while the printhead permanently moves onward. Secondly, for the rapid formation of a discrete droplet in jetting, a high surface tension of the material is necessary. Surface tension always causes minimization of the surface area of a shape, meaning that it aims for a sphere shape, which can prevent satellite formation and splashing, for example. However, the surface tension of silicones is among the lowest in the field of elastomers (even lower surface tensions are possessed only by perfluorinated hydrocarbons). Because of these disadvantages in terms of viscosity and surface energy, the production of elastomeric shaped bodies from high-viscosity silicone rubber compounds by the jetting method was considered to be non-implementable to date. Indeed, this point of view is also supported by numerous scientific publications. If the materials to be jetted and print valves are characterized by properties crucial to processability, namely nozzle diameter, expulsion speed, droplet speed, droplet volume, density, surface tension and viscosity at process shear rate, it is possible to define characteristic dimensionless parameters that describe the interplay of the inertia forces, viscous forces, surface tensions, flow properties, friction forces etc. that occur in jetting. These parameters include, for example, the Reynolds number, the Ohnesorge number, the Weber number and the Z number. Using these numbers, it is possible to infer parameter ranges within which jetting (without satellite formation, splashing, blocking etc.) should be possible (cf., for example, Brian Derby, *Inkjet Printing of Functional and Structural Materials: Fluid Property Requirements, Feature Stability, and Resolution*, Annu. Rev. Mater. Res. 2010. 40:395-414). If the typical properties of silicone rubber compounds are entered into these equations, irrespective of the choice of technical parameters of the printhead, this does not lead to the "green" parameter range, which suggests that jetting of high-viscosity silicone rubber compounds which meets the demands of 3D printing should not be possible.

Even though some manufacturers of print valves state processable viscosities of up to about 2 million mPa·s (at low shear rate), it is found in practice that materials of such high viscosity generally cannot be jetted because the pressure needed to expel the material droplet is inadequate owing to the high material viscosity and the print valve becomes blocked.

SUMMARY OF THE INVENTION

It is an object of the present invention to provide silicone rubber compositions that meet the demands on processing properties and time for use in ballistic additive methods (3D printing), and hence enable high-quality industrial production of elastomeric shaped bodies. In extensive tests, it has been found that, unexpectedly, only the high-viscosity silicone rubber compositions of the invention are suitable for production of high-quality elastomeric moldings by means of 3D printing in a ballistic method since these compositions, by virtue of the formulation, have specific rheological properties. It was found that the degree of shear-thinning characteristics, characterized by a nominal melt flow index n, has to have the magnitude for n according to the invention. More particularly, it has been found that, surprisingly, it is the nature of the shear-thinning characteristics characterized by means of the melt flow index n in the case of high-viscosity silicone rubber compounds that is crucial to the quality of the printed image and not, for instance, as would seem likely, the much lower viscosity ($\eta_2$) which is established after strong shear on the silicone rubber compound owing to the shear-thinning characteristics. It is thus found that, surprisingly, neither the starting viscosity ($\eta_1$) nor the final viscosity ($\eta_2$) which is established after strong shear is crucial; what is instead crucial is the nature and extent of the shear-thinning characteristics, characterized by the nominal melt flow index n.

DETAILED DESCRIPTION OF THE PREFERRED EMBODIMENTS

The advantage of the high-viscosity silicone rubber compositions of the invention is that, without exception, they afford a high-quality printed image, whereas noninventive high-viscosity silicone rubber compositions lead either to blocking and sticking of the print valve or to a crust-like appearance.

The high-viscosity silicone rubber compositions of the invention for the 3D printing of silicone moldings by the ballistic additive DOD method have a viscosity $\eta_1$ (in each case at 25° C. and 0.5 s$^{-1}$) in the range from 300 Pa·s to 10 kPa·s, and comprise (A) 50% to 95% by weight of at least one organosilicon compound having an average of at least two aliphatically unsaturated groups per molecule, (B) 1% to 10% by weight of at least one organosilicon compound having an average of at least two SiH groups per molecule, or, in place of (A)+(B) or in addition to (A) and (B), (G) 0%-95% by weight of at least one organosilicon compound having an average of at least two aliphatically unsaturated groups and at least two SiH groups per molecule, (C) 0.1 to 500 ppm by weight of at least one hydrosilylation catalyst, based on the content of the metal relative to the overall silicone composition, (D) 1% to 50% by weight of at least one actively reinforcing material, (E) 0% to 30% by weight of auxiliaries other than (D), characterized in that the nominal melt flow index n of the silicone rubber composition is within the following range:

$$-1.00 < n < -0.40,$$

where n is calculated from formula (X):

$$\log \eta = \log K + n*\log v \qquad (X)$$

where $\eta$ represents the viscosity at shear rate v,

K represents the nominal consistency index, v represents the shear rate and log represents the decadic logarithm, and the viscosity $\eta_1$, the nominal melt flow index n and the nominal consistency index K in formula (X) are determined by the rheological test method disclosed in the description.

The nature and the extent of the shear-thinning characteristics and hence the degree of the shear-thinning characteristics are characterized by the nominal melt flow index n, where n<0 describes shear-thinning flow characteristics, n>0 describes shear-thickening flow characteristics and n=0 describes newtonian flow characteristics.

The high-viscosity silicone rubber compositions of the invention preferably have a viscosity (in each case at 25° C. and 0.5 s$^{-1}$) in the range from 400 Pa·s to 5 kPa·s, and more preferably from 500 Pa·s to 3 kPa·s.

The nominal melt flow index n of the silicone rubber compositions of the invention is preferably in the range of $-0.80 < n < -0.45$ and more preferably in the range of $-0.70 < n < -0.50$.

Constituent (A) of the silicone rubber compositions of the invention is an organosilicon compound having at least two aliphatic carbon-carbon multiple bonds, preferably linear or branched polyorganosiloxanes composed of units of the formula (I):

$$R_a R^1_b SiO_{(4-a-b)/2} \qquad (I)$$

where

R may be the same or different and is a $C_1$-$C_{20}$ radical which is free of aliphatic carbon-carbon multiple bonds, is optionally halogen-substituted and optionally contains oxygen, nitrogen, sulfur or phosphorus atoms, $R^1$ may be the same or different and is a monovalent, optionally substituted organic radical having an aliphatic carbon-carbon multiple bond, a is 0, 1, 2 or 3 and b is 0, 1 or 2, with the proviso that a+b<4 and there is an average of at least 2 $R^1$ radicals per molecule.

The R radical may comprise mono- or polyvalent radicals, in which case the polyvalent radicals, such as bivalent, trivalent and tetravalent radicals, connect a plurality of, for example two, three or four, siloxy units of the formula (I) to one another.

Preferably, the R radicals are bonded to the silicon via a carbon or oxygen atom. Examples of SiC-bonded R radicals are alkyl radicals (e.g. methyl, ethyl, octyl and octadecyl radicals), cycloalkyl radicals (e.g. cyclopentyl, cyclohexyl and methylcyclohexyl radicals), aryl radicals (e.g. phenyl and naphthyl radicals), alkaryl radicals (e.g. tolyl and xylyl radicals) and aralkyl radicals (e.g. benzyl and beta-phenylethyl radicals). Examples of substituted R radicals are 3,3,3-trifluoro-n-propyl, p-chlorophenyl, chloromethyl, glycidoxypropyl and —$(CH_2)_n$—$(OCH_2CH_2)_m$—$OCH_3$, where n and m are identical or different integers from 0 to 10. Examples of SiO-bonded R radicals are alkoxy groups (e.g. methoxy, ethoxy, iso-propoxy and tert-butoxy radicals) and the p-nitrophenoxy radical.

The $R^1$ radical may be any desired groups amenable to an addition reaction (hydrosilylation) with an SiH-functional compound. The $R^1$ radical preferably comprises alkenyl and alkynyl groups having 2 to 16 carbon atoms, such as vinyl, allyl, methallyl, 1-propenyl, 5-hexenyl, ethynyl, butadienyl, hexadienyl, undecenyl, cyclopentenyl, cyclopentadienyl, norbornenyl and styryl radical, particular preference being given to vinyl, allyl and hexenyl radicals.

If the $R^1$ radical comprises substituted aliphatically unsaturated groups, preferred substituents are halogen atoms, cyano groups and alkoxy groups. Examples of substituted $R^1$ radicals are allyloxypropyl and isopropenyloxy radicals.

Preference is given, as constituent (A), to the use of vinyl-functional, essentially linear polydiorganosiloxanes having a viscosity of 100 to 500,000 mPa·s, more preferably between 1000 and 50,000 mPa·s (at 25° C. and 0.8 sec$^{-1}$). Constituent (A) may be a mixture of different organosilicon compounds of the type described above.

The content of constituent (A) in the silicone rubber composition of the invention is 50% to 95% by weight, preferably 70% to 90% by weight, more preferably 65% to 80% by weight.

Constituent (B) is any SiH-functional organosilicon compound having an average of at least two SiH groups. Constituent (B) functions as crosslinker of the silicone rubber composition. Constituent (B) may also be a mixture of various SiH-functional organosilicon compounds. Preferably, constituent (B) is linear, cyclic, branched or resinous polyorganosiloxanes having Si-bonded hydrogen atoms, composed of units of the formula (II)

$$R_c H_d SiO_{(4-c-d)/2} \quad \text{(II)}$$

where
R may be the same or different and has the definition given above,
c is 0, 1, 2 or 3 and
d is 0, 1 or 2,
with the proviso that the sum total of (c+d) is not more than 3 and there is an average of at least two Si-bonded hydrogen atoms per molecule.

Preferably, constituent (B) contains Si-bonded hydrogen in the range from 0.04 to 1.7 percent by weight (% by weight) based on the total weight of the organopolysiloxane (B). The molecular weight of constituent (B) may vary within wide limits, for instance between $10^2$ and $10^6$ g/mol. For example, constituent (B) may be an SiH-functional oligosiloxane of relatively low molecular weight, such as tetramethyldisiloxane, but may also be high-polymeric polydimethylsiloxane having SiH groups in chain or terminal positions or a silicone resin having SiH groups. Preference is given to the use of SiH-functional compounds of low molecular weight, such as tetrakis(dimethyl-siloxy)silane and tetramethylcyclotetrasiloxane, and SiH-containing siloxanes, such as poly(hydrogenmethyl)siloxane and poly(dimethylhydrogenmethyl)siloxane having a viscosity of 10 to 1000 mPa·s (at 25° C. and 0.8 sec$^{-1}$). Preference is given to constituents (B) that are compatible with constituent (A) (homogeneously miscible or at least emulsifiable). According to the type of constituent (A), it may therefore be necessary to suitably substitute constituent (B), for example by replacing some of the methyl groups with 3,3,3-trifluoropropyl or phenyl groups.

Constituent (B) may be used individually or in the form of a mixture of at least two different (B) and is preferably present in the silicone rubber composition of the invention in such an amount that the molar ratio of SiH groups to aliphatically unsaturated groups is 0.1 to 20, preferably between 0.5 and 5, more preferably between 1 and 2. The content of constituent (B) in the silicone rubber composition of the invention is 0.1 to 15% by weight, preferably 0.5%-10% by weight, more preferably 2%-5% by weight.

Constituent (G) can be used in place of (A)+(B) or in addition to (A) and (B). In the addition-crosslinking compositions of the invention, the following combinations are thus possible: (A)+(B) or (A)+(G) or (B)+(G) or (A)+(B)+(G) or (G) alone. (G) is an organosilicon compound having at least two aliphatically unsaturated groups and at least two SiH groups per molecule and can thus crosslink with itself. Compounds (G) are known to those skilled in the art from the prior art. If compounds (G) are used, they are preferably those composed of units of the general formulae $$R^7_k SiO_{(4-k)/2} \quad \text{(VI)},$$

$$R^7_m R^6 SiO_{(3-m)/2} \quad \text{(VII) and}$$

$$R^7_o HSiO_{(3-o)/2} \quad \text{(VIII)}$$

where
R$^7$ is a monovalent, optionally substituted hydrocarbyl radical which is free of aliphatic carbon-carbon multiple bonds and has 1 to 18 carbon atoms per radical and
R$^6$ is a monovalent hydrocarbyl radical having a terminal aliphatic carbon-carbon multiple bond having 2 to 8 carbon atoms per radical,
k is 0, 1, 2 or 3,
m is 0, 1 or 2,
o is 0, 1 or 2,
with the proviso that, in (G), there is an average of at least 2 R$^6$ radicals and an average of at least 2 Si-bonded hydrogen atoms.

It is possible to use a single compound (G) or a mixture of at least two compounds (G).

The content of constituent (G) in the silicone rubber composition of the invention is 0%-95% by weight, preferably 0%-50% by weight, more preferably 0%-10% by weight.

Constituent (C) serves as catalyst for the addition reaction (hydrosilylation) between the aliphatically unsaturated groups of constituent (A) and the silicon-bonded hydrogen atoms of constituent (B) or (G). In principle, it is possible to use any hydrosilylation catalysts typically used in addition-crosslinking silicone rubber compositions. As catalysts (C) that promote addition of Si-bonded hydrogen onto aliphatic multiple bonds, for example, platinum, rhodium, ruthenium, palladium, osmium or iridium, an organometallic compound or a combination thereof are suitable. Examples of such catalysts (C) are metallic and finely divided platinum which may be present on supports, such as silicon dioxide, aluminum oxide or activated carbon, compounds or complexes of platinum, such as platinum halides, e.g. PtCl$_4$, H$_2$PtCl$_6$.6H$_2$O, Na$_2$PtCl$_4$.4H$_2$O, platinum acetylacetonate and complexes of these compounds, encapsulated in a matrix or a core/shell-like structure, platinum-olefin complexes, platinum-phosphite complexes, platinum-alcohol complexes, platinum-alkoxide complexes, platinum-ether complexes, platinum-aldehyde complexes, platinum-ketone complexes, including reaction products of H$_2$PtCl$_6$.6H$_2$O and cyclohexanone, platinum-vinylsiloxane complexes, such as platinum-1,3-divinyl-1,1,3,3-tetramethyldisiloxane complexes with or without a content of detectable inorganically bound halogen, bis(gamma-picoline)-platinum dichloride, trimethylenedipyridineplatinum dichloride, dicyclopentadieneplatinum dichloride, dimethylsulfoxide-ethyleneplatinum(II) dichloride, cyclooctadieneplatinum dichloride, norbornadieneplatinum dichloride, gamma-picoline-platinum dichloride, cyclopentadieneplatinum dichloride, and reaction products of platinum tetrachloride with olefin and primary amine or secondary amine or primary and secondary amine, such as the reaction product of platinum tetrachloride dissolved in 1-octene with sec-butylamine or ammonium-platinum complexes, trimethylcyclopentadienylplatinum(IV), trimethyl[(3-trimethoxysilyl)propylcyclopentadienyl]platinum(IV).

The hydrosilylation catalysts listed generally enable rapid crosslinking of the silicone rubber composition even at room temperature. Since the hydrosilylation reaction sets in immediately after mixing of all constituents, addition-crosslinking compositions are usually formulated in the form of at least two components, where a component A comprises the platinum catalyst (C) and another component B comprises the crosslinker (B) or (G). In order to have a sufficient processing time even after mixing of the two components, inhibitors which delay the onset of the crosslinking reaction are usually added. Rapid crosslinking can then be brought about by supply of heat. For the use of addition-crosslinking compositions in the 3D printing method, however, preference is given to those hydrosilylation catalysts which can barely be activated by thermal means but can be very readily activated by high-energy radiation (UV, UV-VIS), meaning that the deposited silicone rubber composition of the invention is crosslinked not with thermal initiation but preferably with initiation by UV or UV-VIS radiation. This is effected, for example, either via an activatable hydrosilylation catalyst or via a deactivatable inhibitor (F) which is additionally present. Compared to thermal crosslinking, UV- or UV-VIS-induced crosslinking has numerous advantages. Firstly, the intensity, period of action and locus of action of the UV radiation can be judged accurately, whereas the heating of the silicone rubber composition deposited dropwise (and the subsequent cooling thereof) is always retarded by virtue of the relatively low thermal conductivity. Because of the intrinsically very high coefficient of thermal expansion of the silicones, the temperature gradients that are inevitably present in the course of thermal crosslinking lead to mechanical stresses which have an adverse effect on the dimensional accuracy of the molding formed, which in the extreme case can lead to unacceptable distortions of shape. A further advantage of the UV/VIS-induced addition crosslinking is found in the production of multicomponent moldings, for example hard-soft composites which, as well as the silicone elastomer, comprise a thermoplastic, the thermal warpage of which is avoided.

UV/VIS-induced addition-crosslinking silicone rubber compositions are described, for example in DE 10 2008 000 156 A1, DE 10 2008 043 316 A1, DE 10 2009 002 231 A1, DE 10 2009 027 486 A1, DE 10 2010 043 149 A1 and WO 2009/027133 A2. The crosslinking takes place through UV/VIS-induced activation of a light-sensitive hydrosilylation catalyst (C), preference being given to platinum catalysts activatable by UV or UV-VIS radiation. The technical literature describes numerous light-activatable platinum catalysts which are largely inactive with exclusion of light and can be converted to platinum catalysts that are active at room temperature by irradiation with light having a wavelength of 250-500 nm. Examples of these are ($\eta$-diolefin) ($\sigma$-aryl)platinum complexes (EP 0 122 008 A1; EP 0 561 919 B1), Pt(II)-$\beta$-diketonate complexes (EP 0 398 701 B1) and ($\eta^5$-cyclopentadienyl)tri($\sigma$-alkyl)platinum(IV) complexes (EP 0 146 307 B1, EP 0 358 452 B1, EP 0 561 893 B1). Particular preference is given to MeCpPtMe$_3$ and the complexes that derive therefrom through substitution of the groups present on the platinum, as described, for example, in EP 1 050 538 B1 and EP 1 803 728 B1.

The silicone rubber compositions which crosslink in a UV- or UV-VIS-induced manner can be formulated in single- or multicomponent form.

The rate of UV/VIS-induced addition crosslinking depends on numerous factors, especially on the nature and concentration of the platinum catalyst, on the intensity, wavelength and action time of the UV/VIS radiation, the transparency, reflectivity, layer thickness and composition of the silicone rubber composition, and the temperature. For the activation of the UV/VIS-induced addition-crosslinking silicone rubber compositions, light of wavelength 240-500 nm, preferably 300-450 nm, more preferably 350-400 nm, is used. In order to achieve rapid crosslinking, which is understood to mean a crosslinking time at room temperature of less than 20 min, preferably less than 10 min, more preferably less than 1 min, it is advisable to use a UV/VIS radiation source with a power between 10 mW/cm$^2$ and 15,000 mW/cm$^2$, and a radiation dose between 150 mJ/cm$^2$ and 20,000 mJ/cm$^2$, preferably between 500 mJ/cm$^2$ and 10,000 mJ/cm$^2$. Within the scope of these power and dose values, it is possible to achieve area-specific irradiation times between a maximum of 2000 s/cm$^2$ and a minimum of 8 ms/cm$^2$. It is also possible to use two or more radiation sources, including different radiation sources.

The hydrosilylation catalyst should preferably be used in a catalytically sufficient amount, such that sufficiently rapid crosslinking is enabled at room temperature. Typically, 0.1 to 500 ppm by weight of the catalyst is used, based on the content of the metal relative to the overall silicone rubber composition, preferably 0.5-200 ppm by weight, more preferably 1-50 ppm by weight. It is also possible to use mixtures of different hydrosilylation catalysts.

Constituent (D)

The term "actively reinforcing material" or, synonymously, "reinforcing material" is understood in the context of this invention to mean an (actively) reinforcing filler. Compared to (inactive) non-reinforcing fillers, actively reinforcing fillers improve the mechanical properties of the elastomers in which they are used. Inactive fillers, by contrast, act as extenders and dilute the elastomer. The terms "actively reinforcing material", "actively reinforcing filler", "reinforcing material" and "reinforcing filler" are used synonymously in the context of the present invention.

Constituent (D) is necessary in order to achieve adequate mechanical strength of the silicone elastomer. Mechanical strength is understood to mean the entirety of the properties typical of elastomers, especially hardness, elongation at break, tear resistance and tear propagation resistance. In order to achieve appealing properties in this regard, the addition of actively reinforcing materials is indispensable. These include, in particular, (D1) finely divided particulate materials such as fumed silicas, titanium dioxides, aluminum oxides, aerogels and carbon blacks having a high specific surface area between 50 and 1000 m$^2$/g (measured by the BET method to DIN 66131 and DIN 66132), and (D2) nanoparticles (SiO$_2$, TiO$_2$, exfoliated sheet silicates, carbon nanotubes etc.).

Preferably, component (D) is selected from the group consisting exclusively of (D1) fumed silicas, titanium dioxides, aluminum oxides, aerogels and carbon blacks having a high specific surface area between 50 and 1000 m$^2$/g, measured by the BET method to DIN 66131 and DIN 66132, and (D2) nanoparticles consisting of SiO2, TiO2, exfoliated sheet silicates or carbon nanotubes.

Preference is given to using (D1) as a reinforcing filler. A particularly active and preferred reinforcing agent (D1) is fumed silica (produced, for example, by reaction of silicon-halogen compounds in a hydrogen-oxygen flame).

Fumed silica is hydrophilic because of the silanol groups (—SiOH) present on the surface thereof. However, it is customary and preferable to use hydrophobic silicas in silicone rubber compositions in order to achieve higher filler contents (and hence better mechanical properties) without an excessive rise in viscosity and without phase inversion. Moreover, the mixing of the silicone constituents and the silica is significantly facilitated by the hydrophobic character. The hydrophobization of the silica, which is effected mainly by silylation, is known to those skilled in the art and is described, for example, in published specifications EP 686676 B1, EP 1433749 A1 and DE 102013226494 A1. As a result of the hydrophobization (silylation) of the silica surface, there is a reduction in the silanol group density typically from 1.8 to 2.5 SiOH/nm² down to less than 1.8 to less than 0.9 silanol groups per nm² (determined by means of acid-base titration as stated in G. W. Sears, Anal. Chem. 1956, 28, 1981). At the same time, there is an increase in the carbon content of the silica to 0.4% to 15% by weight of carbon (determined by means of elemental analysis), the weight being based on the hydrophobic silica.

The use of reinforcing agents (D2) is possible but not preferred, because it is impracticable on the industrial scale. Because of the very minor intermolecular interactions between silicones, the production of true nanoparticulate silicone rubber compositions is found to be very difficult. There is usually rapid re-agglomeration of the nanoparticles, or there is no exfoliation or intercalation of sheet silicates in the silicone.

It is also possible to use a plurality of different reinforcing agents (D).

The content of reinforcing agents (D) based on the overall crosslinkable silicone rubber composition is between 1% and 50% by weight, preferably between 5% and 30% by weight, more preferably between 10% and 25% by weight.

Constituent (E) is known to those skilled in the art and includes all optional additives that may be present in the silicone rubber composition of the invention in order to achieve specific profiles of properties. These include inhibitors, heat stabilizers, solvents, plasticizers, color pigments, sensitizers, photoinitiators, adhesion promoters, inactive fillers, thixotropic agents, conductivity additives, silicone resins etc. that are different than the other constituents.

What is to be shown hereinafter is how the nominal melt flow index n and the viscosity $\eta_1$, which are crucial for the processing of high-viscosity silicone compositions by the DOD-3D printing method, can be adjusted in a controlled manner.

The particulate materials (D1) and (D2) detailed above are among the reinforcing fillers. By contrast with the non-reinforcing fillers, for example chalk, quartz flour, polymer powders etc., reinforcing fillers have a high specific surface area, which results in a very high number of filler-filler and filler-silicone interactions. These interactions bring about the desired high mechanical strength of the resulting silicone elastomer.

A further means of achieving a high level of mechanical strength and elasticity is the use of long-chain (and hence higher-viscosity) silicone polymers. Silicone compositions containing short-chain silicone polymers can be crosslinked to give very hard materials, but give less tear-resistant and less elastic silicone elastomers.

The use of reinforcing fillers in combination with long-chain silicone polymers, by virtue of the abovementioned interactions, leads to relatively high-viscosity silicone compositions. However, the viscosity of the silicone composition is often limited at the upper end (and often also additionally at the lower end) by the desired processing method. For instance, the extremely high-viscosity (firm/pasty) solid silicone rubbers are typically processed by the press-molding method or by calendering etc.

Processing by the DOD-3D printing method is increasingly meeting its limits with silicone compositions of ever higher viscosity in spite of all technological advances. In the individual case, it is therefore necessary to make a compromise between the desired high mechanical strength of the silicone elastomer and the processability of the uncrosslinked silicone composition.

In principle, one is confronted with the problem of keeping the viscosity of the silicone composition $\eta_1$ as low as possible for reasons of processability, but at the same time of achieving maximum mechanical strength values. The viscosity of the silicone composition $\eta_1$ (since it is measured at very low shear, which can also be regarded as viscosity at rest or starting viscosity) is fixed in particular by the nature and content of reinforcing filler (D) and the chain length (viscosity) of the silicone polymers used (components (A), (B) and/or (G)).

One skilled in the art knows of numerous ways of keeping the viscosity $\eta_1$ low without significantly reducing the mechanical strength values. These include, for example, the hydrophobization of the filler (for example by silylation of finely divided silicas), which can reduce the increase in viscosity caused by the filler to an enormous degree. In addition, it is possible to keep the viscosity of the silicone composition low through the use of relatively short-chain vinyl-terminated silicone polymers (component (A)) in combination with relatively short-chain SiH-terminal silicone polymers (component (B)) or through the use of relatively short-chain silicone polymers of component (G); in this case, it is only in the course of the crosslinking reaction that the long-chain silicone polymers are constructed through chain extension (i.e. only after the actual processing step such as the jetting).

If the viscosity $\eta_1$ is found to be too high, i.e. more than 10 kPa·s (at 25° C. and 0.5 s$^{-1}$), it is thus possible to counteract this by (i) lowering the filler concentration, (ii) increasing the hydrophobicity of the filler (for example by using hydrophobic fillers or by hydrophobizing hydrophilic fillers) and/or (iii) lowering the polymer chain length of the silicone constituents. The exact adjustment of the viscosity $\eta_1$ can thus be achieved by simple routine experiments.

However, the viscosity at rest $\eta_1$ is not the only crucial factor for the processability of a silicone composition by the DOD method. The viscosity at the extremely high shear rates that occur in the jetting nozzle is also of great significance. Processability of high-viscosity compounds by the DOD method becomes possible at all only by virtue of the fact that the viscosity decreases enormously with increasing shear rate. These characteristics are referred to as shear-thinning characteristics. The decrease in the viscosity as a result of shear may be several orders of magnitude in the DOD method. For the processability of high-viscosity silicone compositions by the DOD method, marked shear-thinning characteristics are thus indispensable.

The shear-thinning characteristics can be well-characterized by the nominal melt flow index n. The nominal melt flow index n describes the deviation from what are called newtonian flow characteristics, which feature a shear rate-independent viscosity and are characterized by the flow index n=0. n values of greater than 0 describe an increase in viscosity with increasing shear rate (shear-thickening characteristics). n values of less than zero describe shear-thinning characteristics, i.e. a decrease in viscosity with increasing shear rate. This relationship can be described by equation (IX) (the logarithmic form of equation (IX) is identical to equation (X)):

$$\eta(v) = K \cdot v^n \quad \text{(IX)}$$

where $\eta(v)$ denotes the viscosity $\eta$ at the shear rate v and K is the nominal consistency index (when n=0, i.e. in the case of newtonian characteristics, K=$\eta$).

In order to determine the two parameters K and n present in the equation (IX), it is sufficient to know two pairs of values (ii at $v_1$) and ($\eta_2$ at $v_2$). For the first pair of values, it is possible, for example, to use the viscosity at rest $\eta_1$ at $v_1$=0.5 s$^{-1}$. Since the shear rate range that occurs on jetting is difficult to attain for measurement purposes (requiring measurements in a high-pressure capillary viscometer), for example, the viscosity $\eta_2$ at $v_2=25$ s$^{-1}$ is taken for the second pair of values, but this does not constitute a restriction owing to the experimentally confirmed validity of equation (IX).

Silicone compositions generally have shear-thinning characteristics, meaning that the nominal melt flow index n is negative. However, it has been found that, surprisingly, irrespective of the processability of the silicone compound, which may quite possibly be processable under high shear given a sufficiently low viscosity, a satisfactory printed image is obtained by the DOD-3D printing method only when the nominal melt flow index n is within a particular range. It is thus quite possible that a compound having lower viscosity at high shear will give a poorer printed image than a compound having higher viscosity at the same shear. In fact, a crucial factor is found to be the degree of the shear-thinning characteristics, i.e. the significance of the decrease in viscosity that occurs when the shear rate is increased. In other words: a sufficiently low viscosity at high shear rate is a necessary condition for processability by the DOD method, but is not a sufficient condition for a good printed image. A necessary and simultaneously sufficient condition for this is the abovementioned relation $$-1 < n < -0.40.$$

There are in principle the following options for bringing the nominal melt flow index n into the range of the invention:

Silicone polymers feature virtually newtonian flow characteristics over a wide shear rate range; only at very high shear rates is there any orientation of the polymer chains in the flow direction, which causes a decrease in viscosity. For this reason, it is less effective to adjust the melt flow index n via an altered composition of the silicone constituents (components (A), (B) and/or (G)).

A much more effective method is found to be the adjustment of the shear-thinning characteristics through suitable choice of the reinforcing filler. More particularly, it is possible to adjust the surface energy of the filler such that the filler particles form a filler network based on physical interactions in the hydrophobic, nonpolar silicone matrix. At rest, this filler network hinders the flowability of the silicone constituents, but breaks down as soon as there is relatively strong shear on the silicone composition, meaning that the flowability of the silicone constituents increases significantly under strong shear, which is equivalent to marked shear-thinning characteristics.

The breakdown of the filler network brought about by the strong shear is reversible, meaning that the compound returns to its original equilibrium state after the shear has stopped (relaxation).

More exact analysis of these shear-thinning characteristics caused by the filler shows that an increase in the surface energy of the filler aggregates is associated with stronger and quicker formation of the filler network, which in turn results in a rise in the starting viscosity (viscosity at rest) $\eta_1$.

This enhanced structure formation can be brought about, inter alia, by structure-forming additives which increase the surface energy of the filler. The enhanced structure formation can alternatively be brought about through the use of less strongly hydrophobic or hydrophobized fillers. In addition, structure formation can be intensified by an increase in the filler content. Given the same filler content, an increase in the specific surface area of the filler also leads to enhanced structure formation of the silicone composition.

If the nominal melt flow index n is thus found to be too high, i.e. more than $-0.40$, it is possible to counteract this by (i) lowering the hydrophobicity of the filler, (ii) by increasing the filler concentration, (iii) by using auxiliaries which can increase the surface energy of the filler (for example thixotropic agents) and/or (iv) by increasing the specific surface area of the filler. The person skilled in the art will thus be able to select the most suitable method taking account of the other boundary conditions to be placed on the silicone composition. The exact adjustment of the nominal melt flow index n can thus be achieved as described by simple routine experiments.

Silicone rubber compositions of the invention can be produced in one-, two- or multicomponent form. In the simplest case, production is effected in the form of a one-component silicone rubber composition of the invention by homogeneous mixing of all components.

The silicone rubber compositions of the invention are used for production of elastomeric shaped bodies by means of ballistic additive DOD methods (3D printing).

The present invention therefore further provides a process for producing elastomeric shaped bodies, characterized in that the shaped bodies are formed from the silicone rubber compositions of the invention by means of ballistic additive DOD methods (3D printing).

Rheological Test Method for Determination of the Nominal Consistency Index K, the Viscosities $\eta_1$ and $\eta_2$, and the Nominal Melt Flow Index n of the Silicone Rubber Composition All measurements were conducted in an Anton Paar MCR 302 rheometer with air bearings at 25° C., unless stated otherwise, according to DIN EN ISO 3219. Measurement was effected with plate-plate geometry (diameter 25 mm) with a gap width of 300 µm. Excess sample material was removed by means of a wooden spatula after the plates had formed the measurement gap (called trimming).

Before the start of the actual measurement profile, the sample was subjected to a defined preliminary shear in order to eliminate the rheological history composed of sample application and formation of the measurement position. This preliminary shear (measurement phase 1) comprises a shear phase of 60 s at a shear rate of $v_1=0.5$ s$^{-1}$, wherein a viscosity value is established very rapidly and remains constant. This viscosity value which is established at the end of measurement phase 1 is referred to as $\eta_1$. Immediately thereafter, there is strong shear at a shear rate of $v_2=25$ s$^{-1}$ that lasts for 60 s (measurement phase 2), which results in an abrupt drop in the viscosity, as a result of the shear-thinning characteristics, to a considerably lower value that remains constant.

The viscosity value which is established in this case at the end of measurement phase 2 is referred to as $\eta_2$.

By inserting these two pairs of values ($v_1$; $\eta_1$) and ($v_2$; $\eta_2$) into formula (X), the two unknowns K (consistency index) and n (melt flow index) are calculated (two equations with two unknowns):

$$\log \eta = \log K + n^* \log v \qquad (X)$$

Determination of Viscosity

The viscosities were measured in an Anton Paar MCR 302 rheometer according to DIN EN ISO 3219: 1994 and DIN 53019, using a cone-plate system (CP50-2 cone) with an opening angle of 2°. The instrument was calibrated with 10000 standard oil from the National Metrology Institute of Germany. The management temperature is 25.00° C.+/−0.05° C., the measurement time 3 min. The viscosity reported is the arithmetic mean of three independently conducted individual measurements. The measurement uncertainty for the dynamic viscosity is 1.5%. The shear rate was chosen depending on the viscosity and is stated separately for each viscosity reported.

EXAMPLES

The examples which follow serve to illustrate the invention without restricting it.

Rheological Test Method

Testing in the examples was effected analogously to the manner described above.

Conditioning of the Silicone Rubber Compositions

All the silicone rubber compositions used for DOD 3D printing were devolatilized prior to processing, by storing 100 g of the composition in an open PE can in a desiccator under a vacuum of 10 mbar at room temperature for 3 h. Subsequently, the composition was dispensed into a 30 ml cartridge having a bayonet seal with exclusion of air and sealed with an appropriate expulsion plunger (plastic piston).

The Luer lock cartridge was then screwed into the vertical cartridge holder of the Vermes dosage valve in a liquid-tight manner with the Luer lock screw connection downward and 3-8 bar compressed air was applied to the pressure plunger at the top end of the cartridge; the expulsion plunger present in the cartridge prevents the compressed air from getting into the previously evacuated silicone rubber composition.

All UV-sensitive silicone compositions were produced under yellow light (with exclusion of light below 700 nm), devolatilized analogously and dispensed into opaque 30 ml cartridges with a Luer lock bayonet seal.

In order to prevent the silicone compositions from absorbing air during storage, the cartridge containers were packed under vacuum with aluminum foil-covered PE inliners using a vacuum welding system from Landig+Lava GmbH & Co. KG, Valentinstraße 35-1, D-88348 Bad Saulgau.

Raw Materials and Silicone Rubber Compositions Used

Vinyl-Functional Polyorganosiloxanes as Per Constituent (A):

A1: vinyldimethylsiloxy-terminal polydimethylsiloxane having a viscosity of 20,000 cSt., available from ABCR GmbH, Karlsruhe, Germany under the "Poly(dimethylsiloxane), vinyldimethylsiloxy terminated; viscosity 20000 cSt." product name, cat. no. AB128873, CAS [68083-19-2] (ABCR catalog).

A2: vinyldimethylsiloxy-terminal polydimethylsiloxane having a viscosity of 500 000 cSt.; CAS No. [68083-19-2].

A3: vinyldimethylsiloxy-terminal trifluoropropylmethyldimethylsiloxane copolymer having a viscosity of 14 Pa·s and a trifluoropropylmethylsiloxy content of 42 mol %, available from ABCR GmbH, Karlsruhe, Germany, under the FMV-4031 name.

A4: vinyldimethylsiloxy-terminal polydimethylsiloxane having a viscosity of 200 cSt., available from ABCR GmbH, Karlsruhe, Germany under the product name DMS-V22, CAS [68083-19-2] (ABCR catalog).

A5: vinyldimethylsiloxy-terminal polydimethylsiloxane having a viscosity of 1000 cSt., available from ABCR GmbH, Karlsruhe, Germany under the product name DMS-V31, CAS [68083-19-2] (ABCR catalog).

SiH-Functional Crosslinkers as Per Constituent (B):

B1: methylhydrosiloxane-dimethylsiloxane copolymer having a molecular weight of Mn=1900-2000 g/mol and a methylhydrogensiloxy content of 25-30 mol %, available from Gelest, Inc. (65933 Frankfurt am Main, Germany) under the product name HMS-301.

B2: SiH-terminated polydimethylsiloxane, CAS: 70900-21-9, available from ABCR GmbH, 76187 Karlsruhe, Germany, under the DMS-H31 name, viscosity 1000 cSt.

B3: SiH-terminated polydimethylsiloxane, CAS: 70900-21-9, available from ABCR GmbH, 76187 Karlsruhe, Germany, under the DMS-H21 name, viscosity 100 cSt.

B4: trimethylsiloxy-terminal methylhydrodimethyltrifluoropropylmethylsiloxane copolymer having a viscosity of 170 mPa·s, an Si-bonded H content of 0.59% by weight and a trifluoropropylmethylsiloxy content of 15 mol %.

Hydrosilylation Catalyst as Per Constituent (C):

C1: UV-activatable platinum catalyst: trimethyl-(methylcyclopentadienyl)platinum(IV), available from Sigma-Aldrich®, Taufkirchen, Germany.

Reinforcing Agent as Per Constituent (D):

D1: a hydrophobized fumed silica having a BET surface area of 300 m²/g and a carbon content of 4.3% by weight was produced analogously to patent specification DE 38 39 900 A1 by hydrophobization using hexamethyldisilazane from a hydrophilic fumed silica, Wacker HDK® T-30 (available from WACKER CHEMIE AG, Munich, Germany).

D2: a hydrophobized fumed silica having a BET surface area of 300 m²/g and a carbon content of 4.7% by weight and a vinyl content of 0.2% by weight was produced analogously to patent specification DE 38 39 900 A1 by hydrophobization using a mixture of hexamethyldisilazane and 1,3-divinyltetramethyldisilazane from a hydrophilic fumed silica, Wacker HDK® T-30 (available from WACKER CHEMIE AG, Munich, Germany).

Optional Constituent (E)

E1: stabilizer (inhibitor) 1-ethynylcyclohexanol; 99%, CAS No. 78-27-3, ≥99%, available from ABCR GmbH, 76187 Karlsruhe, Germany E2: Plasticizer, trimethylsiloxy-terminated polydimethylsiloxane, CAS No. 9016-00-6, available from ABCR GmbH, 76187 Karlsruhe, Germany, under the DMS-T43 name, viscosity 30,000 cSt.

E3: thixotropic agent: epoxidized linseed oil, CAS No. 67746-08-1, "Edenol B 316 Spezial"; from Emery Oleochemicals GmbH, Henkelstr. 67, 40589 Düsseldorf.

Inventive and Noninventive Examples 1-15

The silicone rubber compositions specified in tables 1, 2 and 3 were produced by, in a first step, intimately mixing constituent (A) and constituent (D) as described hereinafter in the weight ratios specified in tables 1, 2 and 3. For this purpose, 60% by weight of the total mass of constituent (A) in the form of 255 g was initially charged in a double-Z kneader at a temperature of 25° C. and the kneader was heated to 70° C. On attainment of 70° C., the total amount of constituent (D), i.e. the hydrophobic fumed silica described as reactant D1 or D2, corresponding to the weight ratios given in tables 1, 2 and 3, was metered in and kneaded in in portions with continuously kneading over the course of 1 hour, and the material was homogenized. Subsequently, the resultant material of relatively high viscosity was kneaded and devolatilized under an oil-pump vacuum (<100 hPa) at 150° C. over the course of 1 hour. After this baking phase, the vacuum was broken and the temperature was adjusted to room temperature. Then the remaining 40% by weight of the total mass of constituent (A), i.e. 170 g, were mixed in and the material was homogenized at room temperature over the course of one hour.

The further production of the silicone rubber compounds was effected (under yellow light or with exclusion of light) by intimate mixing of the mixture of (A) and (D) produced by the method as described above with the other constituents (B), (E) and (C) in Speedmixer® screwtop mixing beakers from Hauschild & Co. KG, Waterkamp 1, 59075 Hamm. For this purpose, the components were successively weighed into the appropriate mixing beaker and mixed manually. Subsequently, the beaker that had been closed with an appropriate screwtop was mixed and degassed at 1500 rpm under a vacuum of 100 mbar in a vacuum Speedmixer® DAC 400.2 VAC-P from Hauschild & Co. KG, Waterkamp 1, 59075 Hamm for at least 5 minutes.

Prior to the vacuum mixing operation in the vacuum Speedmixer®, a small hole was drilled into the screwtop in order to allow the air to escape from the mixing beaker.

Subsequently, the material was dispensed from the mixing beaker into an opaque 30 ml Luer lock cartridge in an air-free manner (with the aid of a Hauschild dispensing system, consisting of an appropriate speed disc and a lever press). Subsequently, the cartridge was sealed with an appropriate expulsion plunger (plastic piston).

The compositions of the inventive and noninventive silicone rubber compositions are given in tables 1 to 3.

TABLE 1

(all figures in % by weight except for C1 in ppm by weight based on Pt metal):

| Constituent | Ex. 1*) | Ex. 2 | Ex. 3*) | Ex. 4 | Ex. 5*) | Ex. 6 |
|---|---|---|---|---|---|---|
| A1 | 52.2 | 52.2 | 66.6 | 66.6 | 44.7 | 44.7 |
| A2 | 21.7 | 21.7 | — | — | — | — |
| B1 | 0.9 | 0.9 | 1.0 | 1.0 | 1.9 | 1.9 |
| B2 | — | — | 7.7 | 7.7 | — | — |
| B3 | 2.9 | 2.9 | — | — | — | — |
| C1 | 25 | 25 | 25 | 25 | 25 | 25 |
| D1 | 22.4 | 22.4 | 24.8 | 24.8 | 19.1 | 19.1 |
| E1 | 0.0025 | 0.0025 | 0.0025 | 0.0025 | 0.0025 | 0.0025 |
| E2 | — | — | — | — | 34.2 | 34.2 |
| E3 | — | 0.05 | — | 0.05 | — | 0.05 |
| Starting viscosity $\eta_1$ (at 25° C.; $v_1 = 0.5$ s$^{-1}$) | | | | | | |
| $\eta_1$ [Pa · s] | 448 | 1060 | 510 | 877 | 351 | 428 |
| Final viscosity $\eta_2$ (at 25° C.; $v_2 = 25$ s$^{-1}$) | | | | | | |
| $\eta_2$ [Pa · s] | 110 | 129 | 152 | 151 | 167 | 67 |
| Nominal melt flow index n | | | | | | |
| n [—] | −0.36 | −0.54 | −0.31 | −0.45 | −0.19 | −0.47 |
| Nominal consistency index K | | | | | | |
| K [Pa · s$^n$] | 349 | 729 | 412 | 643 | 308 | 304 |

*)noninventive

It can be inferred from table 1 that the shear-thinning characteristics are insufficient in the non-inventive examples 1, 3 and 5, resulting in a nominal melt flow index of more than −0.4. Through use of the thixotropic agent E3, which increases the surface energy of the filler D1, it is possible to remedy this problem and establish a flow index within the range claimed (cf. inventive examples 2, 4 and 6).

TABLE 2

(all figures in % by weight except for C1 in ppm by weight based on Pt metal):

| Constituent | Ex. 7 | Ex. 8 | Ex. 9 | Ex. 10 | Ex. 11 |
|---|---|---|---|---|---|
| A1 | — | — | 66.5 | 62.4 | 64.9 |
| A3 | 72.0 | 70.0 | — | — | — |
| B1 | — | — | 3.5 | 4.6 | 4.1 |
| B4 | 3.0 | 3.0 | — | — | — |
| C1 | 25 | 25 | 25 | 25 | 25 |
| D1 | 25 | 27 | 20 | — | — |
| D2 | — | — | 10 | 33 | 31 |
| E1 | 0.0025 | 0.0025 | 0.0025 | 0.0025 | 0.0025 |
| E3 | — | — | — | — | — |
| Starting viscosity $\eta_1$ (at 25° C.; $v_1 = 0.5$ s$^{-1}$) | | | | | |
| $\eta_1$ [Pa · s] | 3410 | 4095 | 1780 | 3930 | 2570 |
| Final viscosity $\eta_2$ (at 25° C.; $v_2 = 25$ s$^{-1}$) | | | | | |
| $\eta_2$ [Pa · s] | 265 | 307 | 230 | 372 | 254 |
| Nominal melt flow index n | | | | | |
| n [—] | −0.65 | −0.66 | −0.52 | −0.60 | −0.59 |
| Nominal consistency index K | | | | | |
| K [Pa · s$^n$] | 2173 | 2592 | 1239 | 2589 | 1706 |

*) noninventive

TABLE 3

(all figures in % by weight except for C1 in ppm by weight based on Pt metal):

| Constituent | Ex. 12* | Ex. 13* | Ex. 14* | Ex. 15* |
|---|---|---|---|---|
| A1 | 16.2 | 16.2 | 31.7 | 31.7 |
| A2 | 48.6 | 48.6 | 48.6 | 48.6 |
| A4 | 18.3 | 18.3 | — | — |
| A5 | 4.9 | 4.9 | — | — |
| B1 | 3.9 | 3.9 | 3.9 | 3.9 |
| C1 | 25 | 25 | 25 | 25 |
| D1 | 8.1 | 8.1 | 15.8 | 15.8 |
| E1 | 0.0025 | 0.0025 | 0.0025 | 0.0025 |
| E3 | — | 0.05 | — | 0.05 |
| Starting viscosity $\eta_1$ (at 25° C.; $v_1 = 0.5$ s$^{-1}$) | | | | |
| $\eta_1$ [Pa · s] | 99 | 126 | 311 | 354 |
| Final viscosity $\eta_2$ (at 25° C.; $v_2 = 25$ s$^{-1}$) | | | | |
| $\eta_2$ [Pa · s] | 78 | 79 | 131 | 136 |

TABLE 3-continued (all figures in % by weight except for C1 in ppm by weight based on Pt metal):

| Constituent | Ex. 12*) | Ex. 13*) | Ex. 14* | Ex. 15*) |
|---|---|---|---|---|
| Nominal melt flow index n | | | | |
| n [—] | −0.06 | −0.12 | −0.22 | −0.24 |
| Nominal consistency index K | | | | |
| K [Pa · s$^n$] | 95 | 117 | 267 | 299 |

*)noninventive

It can be inferred from tables 2 and 3 that, in the noninventive examples 12 to 15, the shear-thinning characteristics are insufficient, resulting in a nominal melt flow index of more than −0.4. This problem can be remedied by increasing the filler concentration, and a melt flow index within the range claimed can be established (cf. inventive examples 7 to 11 in table 2). The increase in the filler concentration simultaneously leads to a rise in the viscosity $\eta_1$ into the range claimed.

DOD-3D Printer:

The silicone rubber compositions produced were processed by the DOD method in a "NEO-3D printer" manufacturing system from "German RepRap GmbH" to give silicone elastomer parts. For this purpose, the abovementioned 3D printer was modified and adapted. The thermoplastic filament dosage unit that was originally installed in the "NEO-3D printer" was replaced by a jetting nozzle from "Vermes Microdispensing GmbH, Otterfing", in order to be able to deposit higher-viscosity to firm pasty materials such as the silicone rubber compositions of the invention in the DOD method.

Since the "NEO" printer was not equipped as standard for the installation of jetting nozzles, it was modified. The Vermes jetting nozzle was incorporated into the printer control system such that the start-stop signal (trigger signal) of the Vermes jetting nozzle was actuated by the G code controller of the printer. For this purpose, a special signal was recorded in the G code controller. The G code controller of the computer used this merely to switch the jetting nozzle on and off (starting and stopping of metering).

For the signal transmission of the start-stop signal, the heating cable of the originally installed filament heating nozzle of the "NEO" printer was severed and connected via a relay to the Vermes nozzle.

The other dosage parameters (metering frequency, rising, falling etc.) of the Vermes jetting nozzle were adjusted by means of the MDC 3200+ Microdispensing Control Unit.

The 3D printer was controlled by means of a computer. The software control and control signal connection of the 3D printer (software: "Repetier-Host") was modified to the effect that both the movement of the dosage nozzle in the three spatial directions and the signal for droplet deposition were thus controllable. The maximum speed of movement of the "NEO" 3D printer was 0.3 m/s.

Dosage System:

The dosage system used for the silicone rubber compositions used was the "MDV 3200A" microdispensing dosage system from "Vermes Microdispensing GmbH", consisting of a complete system having the following components: a) MDV 3200 A—dosage unit with an attachment for Luer lock cartridges, with which 3-8 bar compressed air (hose with adapter) was applied to the top end of the cartridge, b) Vermes MDH-230tfl left nozzle trace-heating system, c) MDC 3200+ MicroDispensing Control Unit, which was in turn connected to the PC controller and via movable cables to the nozzle, enabled the setting of the jetting dosage parameters (rising, falling, opentime, needlelift, delay, no pulse, heater, nozzle, distance, voxel diameter, air supply pressure at the cartridge). Nozzles having diameters of 50, 100, 150 and 200 μm are available. It was thus possible to precisely position ultrafine droplets of the silicone rubber composition in the nanoliter range at any desired xyz position on the workbench or the already crosslinked silicone elastomer layer. Unless stated otherwise, the standard nozzle set installed in the Vermes valve was a 200 μm nozzle. The reservoir vessels used for the silicone rubber composition were upright 30 ml Luer lock cartridges that were screwed onto the dispensing nozzle in a liquid-tight manner and pressurized with compressed air.

The modified "NEO" 3D printing and the "Vermes" dosage system were controlled with a PC and an open source software package "Simplify 3D".

Jetting:

The silicone rubber compositions were repeatedly deposited dropwise in layers of the desired geometry with the jetting nozzle parameters specified hereinafter on a glass microscope slide of area 25×75 mm, with continuous irradiation and resultant crosslinking of the deposited material over the entire printing operation (about 50 sec) with a BLUEPOINT irradiation system having an output of 13,200 mW/cm$^2$. Nozzle diameter: 200 μm, rising: 0.3 ms, falling: 0.1 ms, open time: 15 ms, needle lift: 100%, delay (surface pressure): 25 ms, delay (individual points for the voxel size measurement): 100 ms, heating: 45° C., cartridge supply pressure: 3 bar.

In this way, it was possible to use the silicone rubber compositions of the invention to obtain transparent silicone elastomer molded parts of different geometry.

Figure 1:
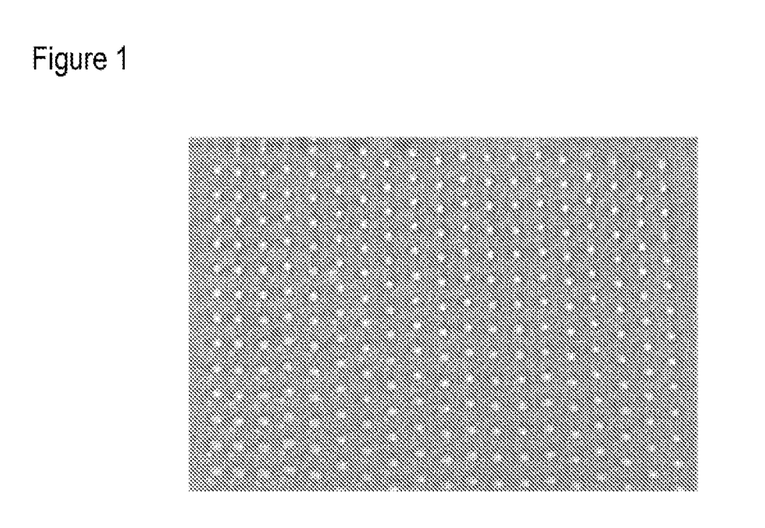
FIG. 1 illustrates a 3D article printed from an inventive printing composition.
Figure 2:
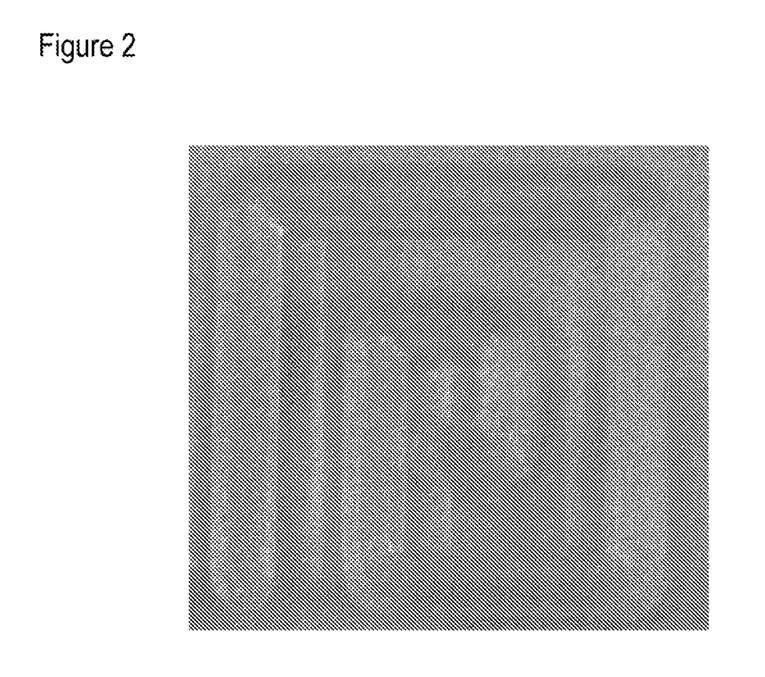
FIG. 2 illustrates a further 3D article printed from an inventive printing composition.
Figure 3:
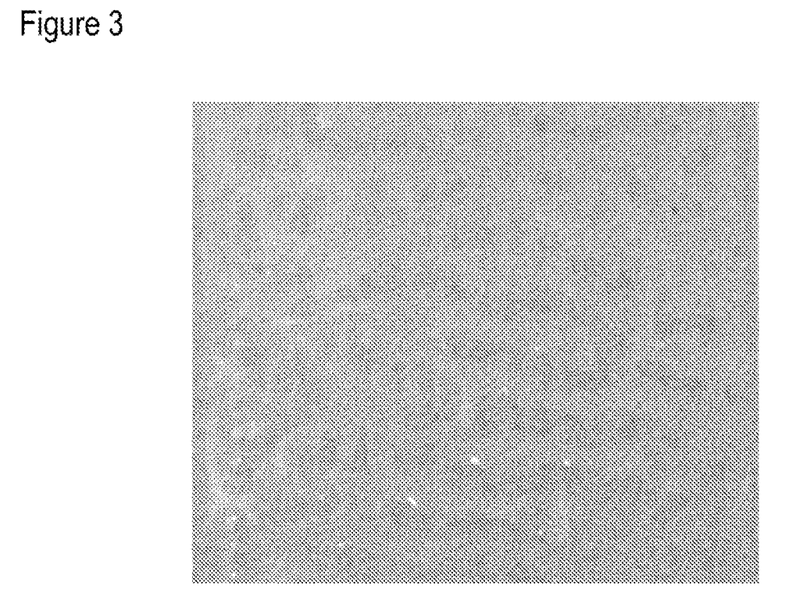
FIG. 3 illustrates a 3D article printed from a non-inventive printing composition.
Figure 4:
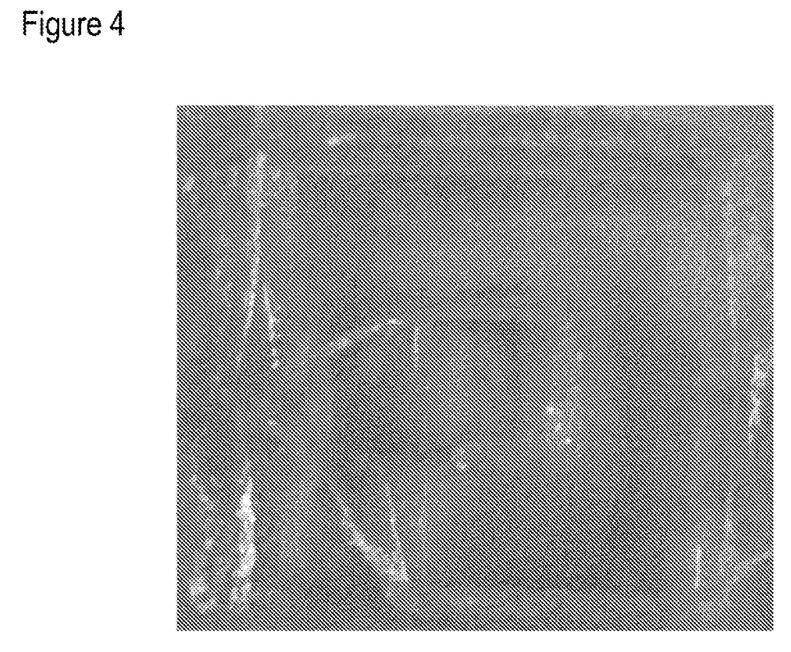
FIG. 4 illustrates a further 3D article printed from a non-inventive printing composition.

While the inventive high-viscosity silicone rubber compositions listed in tables 1-3, without exception, gave a high-quality printed image, the noninventive high-viscosity silicone rubber compositions led either to blocking and sticking of the print valve or gave a crust-like appearance. The inventive silicone rubber compositions have a melt flow index n of less than −0.40 and could be jetted without any problem by the DOD method (cf. inventive dot matrix in FIG. 1 and inventive spiral silicone elastomer molding in FIG. 2). The appearance in the case of use of the noninventive compounds is shown by way of example by FIG. 3 for the printed dot matrix and by FIG. 4 for the spiral silicone elastomer molding.

The invention claimed is:

1. A high-viscosity silicone rubber composition for 3D printing of silicone components in a ballistic additive DOD method, having a viscosity $\eta_1$ at 25° C. and 0.5 s$^{-1}$ in the range from 300 Pa·s to 10 kPa·s, comprising:
   (A) 50% to 95% by weight of at least one organosilicon compound having an average of at least two aliphatically unsaturated groups per molecule,
   (B) 1% to 10% by weight of at least one organosilicon compound having an average of at least two SiH groups per molecule, or, in addition to (A) and (B),
   (G) 0%-39% by weight of at least one organosilicon compound having an average of at least two aliphatically unsaturated groups and at least two SiH groups per molecule, or, in place of (A)+(B),
   (G) 50%-95% by weight of at least one organosilicon compound having at least two aliphatically unsaturated groups and at least two SiH groups per molecule, (C) 0.1 to 500 ppm by weight of at least one hydrosilylation catalyst, based on the content of metal of the hydrosilylation catalyst relative to overall weight of the silicone rubber composition, (D) 10% to 50% by weight of at least one reinforcing material, where component (D) is selected from the group consisting of (D1) fumed silicas, titanium dioxides, aluminum oxides, aerogels and carbon blacks, having a high specific surface area between 50 and 1000 m²/g measured by the BET method according to DIN 66131 and DIN 66132, and (D2) nanoparticles consisting of $SiO_2$, $TiO_2$, exfoliated sheet silicates, and carbon nanotubes, and mixtures thereof, (E) 0% to 30% by weight of auxiliaries other than components (A) (D) of the composition, where component (E) is selected from the group consisting of inhibitors, heat stabilizers, solvents, plasticizers, color pigments, sensitizers, photoinitiators, adhesion promoters, non-reinforcing fillers, thixotropic agents, conductivity additives, silicone resins, and mixtures thereof, wherein all percents by weight are relative to the total weight of the high-viscosity silicone rubber composition and total 100%, wherein the nominal melt flow index n of the silicone rubber composition is within the following range:

$-1.00 < n < -0.40$, where n is calculated from formula (X):

$$\log \eta = \log K + n + \log v \qquad (X)$$

where

η represents the viscosity at shear rate v,
K represents the nominal consistency index,
v represents the shear rate and
log represents the decadic logarithm,
and the viscosity η, the nominal melt flow index n and the nominal consistency index K in formula (X) are determined by the rheological test method disclosed in the description, the composition being used in the 3D printing of articles by a ballistic DOD method.

2. The silicone rubber composition of claim 1, wherein the melt flow index n of the silicone rubber composition is within the range:

$-0.80 < n < -0.45$.

3. The silicone rubber composition of claim 1, wherein the melt flow index n of the silicone rubber composition is within the range:

$-0.70 < n < -0.50$.

4. The silicone rubber composition of claim 1, wherein the viscosity $\eta_1$ at 25° C. and 0.5 s$^{-1}$ is in the range from 400 Pa·s to 5 kPa·s.

5. The silicone rubber composition of claim 2, wherein the viscosity $\eta_1$ at 25° C. and 0.5 s$^{-1}$ is in the range from 400 Pa·s to 5 kPa·s.

6. The silicone rubber composition of claim 3, wherein the viscosity $\eta_1$ at 25° C. and 0.5 s$^{-1}$ is in the range from 400 Pa·s to 5 kPa·s.

7. The silicone rubber composition of claim 1, wherein the viscosity $\eta_1$ at 25° C. and 0.5 s$^{-1}$ is in the range from 500 Pa·s to 3 kPa·s.

8. The silicone rubber composition of claim 2, wherein the viscosity $\eta_1$ at 25° C. and 0.5 s$^{-1}$ is in the range from 500 Pa·s to 3 kPa·s.

9. The silicone rubber composition of claim 3, wherein the viscosity $\eta_1$ at 25° C. and 0.5 s$^{-1}$ is in the range from 500 Pa·s to 3 kPa·s.

10. The silicone rubber composition of claim 1, wherein component (D) is selected from the group consisting of (D1) fumed silicas, titanium dioxides, aluminum oxides, aerogels and carbon blacks having a high specific surface area between 50 and 1000 m²/g measured by the BET method according to DIN 66131 and DIN 66132, or a mixture thereof.

11. The silicone rubber composition of claim 1, wherein component (D) is selected exclusively from (D1) fumed silicas.

12. The silicone rubber composition of claim 1, wherein the hydrosilylation catalyst (C) is a platinum catalyst activatable by UV or UV-VIS radiation.

13. A process for producing an elastomeric shaped body, comprising forming the shaped body from a silicone rubber composition of claim 1, by means of a ballistic additive DOD method.

14. An elastomeric shaped body prepared by the ballistic additive DOD method of claim 13.

15. A process for producing an elastomeric shaped body, comprising forming the shaped body from a silicone rubber composition of claim 2, by means of a ballistic additive DOD method.

16. A process for producing an elastomeric shaped body, comprising forming the shaped body from a silicone rubber composition of claim 4, by means of a ballistic additive DOD method.

17. The silicone rubber composition of claim 1, wherein the viscosity at 25° C. and 0.5 s$^{-1}$ is in the range of 877 Pa·s to 3 kPa·s.

* * * * *

UNITED STATES PATENT AND TRADEMARK OFFICE
CERTIFICATE OF CORRECTION

PATENT NO. : 10,676,641 B2
APPLICATION NO. : 15/744396
DATED : June 9, 2020
INVENTOR(S) : Frank Achenbach et al.

Page 1 of 1

It is certified that error appears in the above-identified patent and that said Letters Patent is hereby corrected as shown below:

In the Claims

Column 24, Line 47, Claim 17:
After "wherein the viscosity"
Insert -- $\eta_1$ --

Signed and Sealed this
Third Day of November, 2020

Andrei Iancu
*Director of the United States Patent and Trademark Office*